(12) United States Patent
Frandsen (10) Patent No.: US 8,660,259 B2
(45) Date of Patent: Feb. 25, 2014

(54) AUTOMATIC PERMUTATION SETUP AND CALIBRATION OF A HEADSET INTERFACE UNIT

(75) Inventor: Otto Frandsen, Copenhagen (DK)

(73) Assignee: GN Netcom A/S (DK)

( * ) Notice: Subject to any disclaimer, the term of this patent is extended or adjusted under 35 U.S.C. 154(b) by 167 days.

(21) Appl. No.: 13/142,765

(22) PCT Filed: Dec. 28, 2009

(86) PCT No.: PCT/EP2009/067941
§ 371 (c)(1),
(2), (4) Date: Jun. 29, 2011

(87) PCT Pub. No.: WO2010/076298
PCT Pub. Date: Jul. 8, 2010

(65) Prior Publication Data
US 2011/0268257 A1    Nov. 3, 2011

(30) Foreign Application Priority Data

Dec. 30, 2008  (EP) .................................... 08022531

(51) Int. Cl.
*H04M 9/00*    (2006.01)

(52) U.S. Cl.
USPC ................................ 379/387.01; 379/390.01

(58) Field of Classification Search
USPC .......................................... 379/387.02–397
See application file for complete search history.

(56) References Cited

U.S. PATENT DOCUMENTS

| | | | |
|---|---|---|---|
| 4,930,156 A | | 5/1990 | Norris |
| 5,729,603 A | * | 3/1998 | Huddart et al. ............ 379/395.01 |
| 5,896,451 A | * | 4/1999 | Deas ............................ 379/22.01 |
| 6,128,384 A | * | 10/2000 | Papadopoulos et al. ...... 379/413 |
| 6,683,949 B1 | * | 1/2004 | Stelman ..................... 379/387.01 |
| 6,718,034 B1 | * | 4/2004 | Larsen ....................... 379/390.01 |
| 7,110,977 B2 | * | 9/2006 | Semret et al. .................... 705/37 |

(Continued)

FOREIGN PATENT DOCUMENTS

| | | |
|---|---|---|
| EP | 1150539 | 10/2001 |
| WO | WO 97/36411 | 10/1997 |
| WO | WO 98/15097 | 4/1998 |
| WO | WO 99/46912 | 9/1999 |

OTHER PUBLICATIONS

English translation of Office Action issued by SIPO on Jun. 14, 2013 for Chinese Application No. 200980153346.1.

(Continued)

*Primary Examiner* — Duc Nguyen
*Assistant Examiner* — Assad Mohammed
(74) *Attorney, Agent, or Firm* — Altera Law Group, LLC (57) ABSTRACT

A method for automatically configuring an interface unit (112, 212, 912, 1012, 1112) for connecting a headset (110, 210, 910, 1110) and a telephone (100) by electrical connections (992, 993, 1092, 1093). The electrical connections (992, 993, 1092, 1093) between the interface unit (112, 212, 912, 1012, 1112) and the telephone (100) comprise two pairs of electrical paths having a number of distinct permutation settings. Each of the number of distinct permutation settings have a complementary setting together forming a number of distinct complementary setting pairs. The method comprises the steps of: a) receiving a test signal, b) for each distinct permutation setting generating an output signal in response to the test signal, c) determining a least preferred distinct permutation setting based on the output signals, d) selecting the complementary setting to the least preferred distinct permutation setting as a preferred setting.

18 Claims, 8 Drawing Sheets

(56) References Cited

U.S. PATENT DOCUMENTS 7,633,963 B1 * 12/2009 Anderson et al. ............ 370/463
2004/0006551 A1 * 1/2004 Sahinoja et al. ................ 707/1

OTHER PUBLICATIONS

Chinese Search Report by SIPO for Chinese Application No. 200980153346.1 dated Jun. 7, 2013.

* cited by examiner

AUTOMATIC PERMUTATION SETUP AND CALIBRATION OF A HEADSET INTERFACE UNIT

The present invention relates to a method for automatically configuring an interface unit for connecting a headset and a telephone by electrical connections. Furthermore, the present invention relates to an interface unit for connecting a headset to a telephone in a system, wherein the telephone comprises a handset port, the handset port comprising one pair of receive connections for transmitting signals received from a telephone line to a handset, and one pair of transmission connections for receiving signals to be transmitted to the telephone line from the handset. The headset comprises an interface connection means for connecting the headset to the interface unit.

Although telephone line ports of telephones are highly regulated and standardized with regards to the electrical properties and the port pin-out, such standardization has not taken place regarding the handset ports of telephones. Therefore, peripheral units, such as headsets, which are to be connected to the handset port, must be adapted to the specific telephone to which the unit is connected. Often such peripheral units are manufactured by third parties, making it highly desirable for the units to be configurable to allow connection to a variety of telephone models. When connecting a headset interface unit to a telephone, especially the electrical permutation setting and the microphone gain, must be set correctly in order to provide the headset user with the best user experience.

The permutation setting is the physical mapping of the pins of the handset port to the receive and transmit lines of the interface unit. Commonly, the permutation setting is simply chosen by trial and error, e.g. by the user changing a mechanical multi-position switch. However, often a number of settings may appear to the user as being suitable, thus making it difficult to pick the best one. This may result in less than ideal sound quality for the user, possibly leading to the need for technical support or even a failure report on a functioning but mal-configured product. Alternatively, the user may be provided with a large lookup table containing the best settings for many different telephone models. Such a table is inconvenient for the user to utilize and tedious for the headset manufacturer to maintain.

Likewise, different telephones in general also apply different gain in the handset to the outgoing audio signal from the microphone. This requires the headset interface to calibrate its microphone gain to substantially match that of the handset. Commonly, the microphone gain setting is calibrated by the headset user calling a person on another telephone, and then calibrating the gain manually until the person on the other telephone finds the signal level to be acceptable. This procedure is inefficient, requiring another person to be available in assisting with the calibration. Furthermore, the other person may be exposed to uncomfortably loud signals.

WO 98/15097 discloses a telephone interface unit that automatically configures itself to couple a headset to a telephone. The interface unit comprises a switch matrix for coupling various signal lines of the telephone to various signal lines of the headset and a control logic for automatically setting the switch matrix.

WO 97/36411 discloses a system for establishing connection between proprietary handset ports on telephone base units and voice/data accessory products by allowing a user to automatically calibrate the telephone accessory product for establishing an interface match with the intended telephone base unit.

It is an object of the present invention to obtain a new method for automatically configuring the permutation setting of a headset interface, and a new method for automatically calibrating a microphone gain of a headset interface, which overcomes or ameliorates at least one of the disadvantages of the prior art or which provides a useful alternative. Additionally, it is an object of the invention to obtain a headset interface and a system for voice communication, which overcomes or ameliorates at least one of the disadvantages of the prior art or which provides a useful alternative.

According to the invention, the first object is obtained by a method for automatically configuring an interface unit for connecting a headset and a telephone by electrical connections. The electrical connections between the interface unit and the telephone comprise two pairs of electrical paths each having a first transmission direction and a complementary second transmission direction together defining a set of distinct permutation settings. Each of the distinct permutation settings has a complementary setting together forming a number of distinct complementary setting pairs. The method comprises the steps of:
a) receiving a test signal,
b) for each distinct permutation setting generating an output signal in response to the test signal,
c) determining a least preferred distinct permutation setting based on the output signals,
d) selecting the complementary setting to the least preferred distinct permutation setting as a preferred setting. This method of selecting the preferred permutation setting is advantageous, since the least preferred setting is commonly easily detectable. In contrast, one or more non-preferred settings may be found to yield output signals almost identical to the preferred setting, making it difficult to distinguish the preferred setting from the one or more non-preferred settings. The headset may be connected to the headset interface either by a wire connection, or by a wireless connection. A wireless connection may be provided by any suitable technology, including Bluetooth, DECT, WLAN, WI-FI, and ZigBee. It is clear to the skilled person that a first distinct permutation setting may already be selected before the test signal is received. Indeed, depending on the actual hardware implementation of the interface unit, it may not be possible to have a state where no setting is selected.

In one embodiment of the invention, the test signal received in step a) is a dial-tone. This embodiment of the inventive method is advantageous, since a dial-tone is commonly available merely by connecting the telephone to a telecommunication network, such as the public switched telephone network (PSTN). Therefore, no signal generator is required to provide a test signal.

In another embodiment, the output signals generated in step b) are based on measurements of one or more of a signal strength, a total harmonic distortion, and/or a signal to noise ratio for each distinct permutation setting. The output signals may be generated in various ways, ranging from a quantitative measurement of signal strength to more qualitative measurements of, e.g., the total harmonic distortion (THD) or signal to noise ratio (SNR).

In another embodiment, step c) and step d) are carried out jointly by, for each distinct permutation setting determining a ratio between the output signal from the permutation setting and the output signal from the complementary setting, and selecting the setting with the highest ratio as the preferred setting. This embodiment provides a simple method of finding the preferred setting. Of course, this only needs to be carried out for each complementary permutation setting pair.

Here, it is assumed that the output signal from the permutation setting is larger than that of the complementary setting, resulting in an improper fraction and thus a ratio larger than unity. Alternatively, one may search for the smallest value smaller than unity, if the denominator is larger than the numerator. It is also clear that the ratio does not need to be worked out for each setting, but merely once for each setting pair.

According to another embodiment, the method further comprises steps of:
a1) transmitting a transmission test signal,
b1) for each distinct permutation setting generating a transmission output signal in response to the transmission test signal, and
c1) determining a least preferred permutation setting based on the output signals and the transmission output signals. This embodiment yields an extra degree of certainty in determining the preferred permutation setting, however at the cost of added complexity, since an external unit may be required. It may be envisioned to perform the additional method steps in this embodiment only if an insufficient certainty is achieved in determining the preferred permutation setting from the received test signal, according to one of the previously mentioned embodiments.

In another embodiment of the invention, the two connections of a transmit pair of electrical paths are denoted TX+ and TX−, and the two connections of a receive pair of electrical paths are denoted RX+ and RX−, wherein the permutation settings have seven distinct configurations, which settings are denoted:

|   | 1 | 2 | 3 | 4 |
|---|---|---|---|---|
| A | TX+ | RX+ | RX− | TX− |
| B | RX+ | TX+ | TX− | RX− |
| C | TX+ | TX− | RX+ | RX− |
| D | RX+ | RX− | TX+ | TX− |
| E | TX+ | RX+ | TX− | RX− |
| F | RX+ | TX+ | RX− | TX− |
| G | TX+ | RX+ | RX− | TX− | and wherein permutation settings A and B are complementary, C and D are complementary, and E and F are complementary.

A second object of the invention is obtained by a calibration method for automatically configuring an interface unit for connecting a headset and a telephone. The interface unit comprises a variable gain circuit for setting a microphone gain. The method comprising the steps:
a) establishing a connection to a dial-in setup server (DISS),
b) automatically configuring the permutation settings of the interface unit, according to any of the above-mentioned embodiments,
c) for at least a first microphone gain setting, transmitting a test signal from the interface unit to the dial-in setup server, and at the dial-in setup server measuring at least a first parameter of the received test signal, and
d) determining a preferred microphone gain setting based on measurements performed in step c). By performing both configuration of the permutation setting and microphone gain while connection is maintained to the DISS, a minimum of user intervention is needed. For instance, only one call to the DISS is required for most setup cases. Thus, an automatic and user friendly setup procedure is achieved to ideally provide the headset user with an optimally configured headset interface, and thus the best achievable sound quality. Alternatively, steps a) and b) may be reversed, so that the permutation setting is automatically configured before a call is placed to the DISS. This minimizes the call time, which has the advantage that the telephone line is busy for a shorter time, and, thus, maximizing the capacity of the DISS.

According to a broader aspect of the invention, step b) may be undertaken by any suitable means of configuring the permutation settings, e.g. by the user manually setting a switch to a desired value as found in a lookup table, by trial and error, or by any other means. The following embodiments relating to the gain setting method apply to both the case where step b) is performed with the above-mentioned method, and to the broader aspect wherein configuration of the permutation setting is achieved in any other way. According to this broader aspect of the invention, the calibration method comprises the steps of:
a) establishing a connection to a dial-in setup server (DISS),
b) selecting a permutation settings of the interface unit by any suitable method,
c) for at least a first microphone gain setting, transmitting a test signal from the interface unit to the dial-in setup server, and at the dial-in setup server measuring at least a first parameter of the received test signal, and
d) determining a preferred microphone gain setting based on measurements performed in step c). Also in this embodiment, steps a) and b) may be reversed.

In one embodiment of the inventive method, the measured parameter in step c) is any one of a quantitative signal parameter, such as a signal strength, or a qualitative signal parameter, such as a signal-to-noise ratio, a total harmonic distortion, or any other suitable signal parameter. The final decision on the preferred microphone gain setting may be based on a comparison of the parameter values measured in a series of measurements, corresponding to a range of microphone gain settings, to a predetermined target level range. For instance, the microphone gain setting, which yields a measured signal strength that is closest to a target level. Or, the preferred microphone gain setting may be calculated from a measurement corresponding to a single microphone gain setting. Alternatively, the preferred microphone gain setting may be chosen in a trade-off between one or more quantitative and/or qualitative signal parameters. For instance, a lower signal strength may be acceptable, if clipping is thus avoided, or a higher signal strength may be better, if there is noise on the transmission.

In another embodiment, step c) comprises the steps of:
c1) selecting a lowest gain setting and transmitting a test signal, and measuring at least a first parameter of the received test signal at the dial-in setup server, and
c2) repeating step c1) for an incremented gain setting, up to a maximum gain setting. The measurement series is initiated with the lowest signal first to prevent clipping protection in the telephone, which may be implemented as automatic gain control with a long release time, from having an influence when the succeeding signal is sent. Once the signal level measured exceeds the target level range of interest, no further measurements are needed. The number of measured parameters for each gain setting does not have to be constant for the whole measurement series, e.g. only one parameter is measured for some test signals and more than one is measured for other test signals.

In another embodiment, a measurement is performed for each gain setting, until the measurement reaches a threshold value, after which one or more supplementary measurements are performed for each of one or more of the remaining gain settings. For example, only a signal strength is measured for each gain setting, until minimum threshold signal strength is measured, after which both the signal strength, and, e.g., a signal-to-noise ratio is measured for subsequent measurement. Alternatively, a measurement of the total harmonic distortion is only performed if a signal-to-noise ratio is better than a given threshold.

In a particular embodiment, the qualitative measurement is performed until, e.g. the signal strength reaches a maximum threshold, whereafter, again, only the signal strength is measured for the remaining gain settings. Alternatively, the measurement series may be terminated when the signal strength reaches a maximum threshold.

In another embodiment, the test signals transmitted from the interface unit are unique for each gain setting. In this way, the dial-in setup server may easily record the gain setting corresponding to a received signal. Additionally, by using individual test signals for each gain setting, the method is able to robustly handle e.g. signals too weak to detect, since the remaining test signals are not affected by any test signals not detected.

In another embodiment, the test signals transmitted from the interface unit are dual-tone multi-frequency (DTMF) signals. Such signals are easily detectable and are highly suitable for transmission over telephone lines. They may be decoded, e.g., by a conventional Goertzel algorithm, as known in the art.

In another embodiment, the method further comprises the steps of:
e) if no suitable gain setting is found, a procedure to change permutation setting to an alternative setting is initiated. If the calibration fails or finds that the gain should be set very high or very low, this may indicate that the permutation setting used is not correct. One reason could be that permutation setting "A" was found as the preferred setting, but the telephone expects the setting "G", corresponding to a carbon microphone. In this case, the interface unit should be reconfigured to setting "G" and the calibration process should be repeated. Likewise, if the interface unit is configured to the "G" setting, and the calibration results in a very low gain setting, the interface unit should be reconfigured to setting "A" and calibration should be repeated. For choosing between setting "A" and setting "G" it may be necessary to compare measured qualitative parameters, such as THD and SNR. The procedure to change permutation setting may either take place while the connection to the server is maintained, or may be performed offline. In the latter case, a new call may be performed to the server to confirm the new setting.

In one embodiment of the calibration method, the headset user may be instructed, e.g. by a message on a display on the interface unit, to manually change the permutation setting while a connection to the DISS is active, and before a microphone calibration is performed. At this point, the found microphone gain setting and the permutation setting may be accepted as the preferred settings, or the user may be instructed to select another permutation setting, after which the microphone calibration method is used again. Then the user is instructed on which permutation setting to use, the microphone gain setting is applied and the call may be terminated. Of course, this embodiment is not limited to two different permutation settings, and any number of settings may be tested before a final decision is made.

In another embodiment, the variable gain circuit also comprises means for setting a speaker gain, and the method further comprises the steps of:

g) for at least a first speaker gain setting, transmitting a test signal from the dial-in setup server to the interface unit, and at the interface unit measuring at least a first parameter of the received test signal, and
h) determining a preferred speaker gain setting based on measurements performed in the previous step. By this method, a speaker gain may also be adjusted to provide the headset user with a comfortable speaker volume. During the automatic calibration, the speaker may be muted, so that the user is not subject to unpleasantly loud signals. Analogously to the selection of the microphone gain setting, the speaker gain setting may be selected either by comparison of a series of measurements, corresponding to a range of speaker gain settings. Or, the speaker gain setting may be calculated from a single measurement, corresponding to a single speaker gain setting. Fine tuning may be performed by the headset user to fit personal preference.

In another embodiment, the method further comprises the step of:
i) Logging statistical information about configuration at dial-in setup server, the statistical information being one or more of the following:
basic call information, such as caller ID and call length,
preferred permutation setting and number of permutation settings tested,
preferred calibration setting found by calibration method,
measured parameters of the received test signals,
status for calibration process upon call completion,
number of retransmission,
round trip delay in telephone network, and/or
time for user to manually switch permutation setting.

This statistical data may provide a headset manufacturer with valuable insight into the most commonly used permutation and gain settings of the telephones on the market. Such insight may be used to tailor, e.g. budget products to the most commonly used configurations by leaving out support for more rarely used configurations. Furthermore, such insight enables optimisation of the calibration method itself, e.g. with regards to the required length of transmitted signals, time-outs, etc.

According to the invention, an object is obtained by an interface unit, which comprises a telephone side and a headset side, the telephone side comprising a telephone port, and the headset side comprises a headset connection means for being connected with the interface connection means on the headset. The telephone port comprises at least four electrical connections), the at least four electrical connections each having a first transmission direction and a complementary second transmission direction together defining a set of distinct permutation settings, and wherein each of the distinct permutation settings has a complementary setting together forming a number of distinct complementary setting pairs. Furthermore, the interface unit comprises:
switching means adapted for configurably connecting the four electrical connections on the telephone side of the interface unit to the headset connection means,
measurement means on the headset side of the switching means for measuring a signal received through the telephone port, and
controlling means for configuring the switching means and for analysing measurements obtained from the measurement means. The controlling means are adapted for determining a least preferred setting of the switching means selected from the distinct permutation settings, and are further adapted for determining a preferred setting as the complement of the least preferred setting, the preferred setting being the distinct complementary setting pair to the least preferred setting. Finally, the controlling means are adapted for configuring the switching means to the setting found to be the preferred setting. The switching means enables the interface unit to be configured to a variety of telephone configurations, in that different permutation settings of the electrical connections of the headset may be chosen to suit the permutation of the handset port. In this way, a headset may be connected to different telephones by changing the permutation setting of the headset interface. The controlling means are adapted to be able to automatically configuring the permutation settings by the inventive method described above. In this context, a telephone line is meant to be understood as any communication line suitable for voice communication, such as a conventional public switched telephone network (PSTN) line, a private branch exchange (PBX) line or a voice over Internet protocol (VOIP) line.

In an embodiment, the interface unit further comprises a variable gain circuit for adjusting a microphone gain, the variable gain circuit being controllable by the controlling means, wherein the interface unit further comprises:
  a signal generating means adapted for generating one or more test signals to be transmitted over the telephone line, wherein the signal generating means is connected to the variable gain circuit, and
  a signal receiving means for receiving a signal from the telephone line, wherein the signal generating means and the signal receiving means are both being controlled by the controlling means. The test signals generated by the signal generating means are passed through the variable gain circuit before being transmitted over the telephone line. As such, the test signals may be subject to substantially the same gain as the voice input recorded by the headset microphone would experience. Adapting the interface unit to generate and receive signals over the telephone line enables the variable gain circuit to be configured according to the inventive method described above.

In one embodiment, the signal generating means is adapted for generating dual-tone multi-frequency (DTMF) signals.

In another embodiment, the signal receiving means is adapted for receiving and decoding DTMF signals from the telephone line.

According to a broader aspect of the invention, the interface unit is adapted for having the permutation setting configured by any other means, e.g. by the user selecting a setting based on a lookup table. As such, the interface unit is adapted for being automatically calibrated according to the calibration method, but not for automatic configuration by the method for automatically configuring the permutation setting. Any following embodiments of the interface unit according to the invention apply both to the specific aspect of the interface unit adapted for automatic permutation setting configuration, and for interface units according to the broader aspect of the invention, where the permutation setting is configured by any other means.

In one specific embodiment of the interface unit according to this aspect, the telephone comprises a handset port, the handset port comprising one pair of receive connections for transmitting signals received from a telephone line to a handset, and one pair of transmission connections for receiving signals to be transmitted to the telephone line from the handset, and the headset comprises an interface connection means for connecting the headset to the headset interface, wherein the interface unit comprises a telephone side and a headset side, the telephone side comprising a telephone port, and the headset side comprises a headset connection means for being connected with the interface connection means on the headset, wherein the telephone port comprises at least four electrical connections, wherein the interface unit further comprises:
  switching means adapted for configurably connecting the four electrical connections on the telephone side of the interface unit to the headset connection means,
  a variable gain circuit for adjusting a microphone gain,
  a signal generating means adapted for generating one or more test signals to be transmitted over the telephone line, wherein the signal generating means is connected to the variable gain circuit,
  a signal receiving means, for receiving a signal from the telephone line, and
  controlling means for controlling the variable gain circuit, the signal generating means and the signal receiving means.

A final object of the invention is obtained by a system for voice communication, which comprises
  a headset for communication, the headset comprising interface connection means,
  a telephone, and
  an interface unit according to any of the aforementioned embodiments for connecting the headset to the telephone. The system provides automatic configuration of the permutation setting, thus enabling the headset and interface unit to be combined with a wide selection of commercially available telephones. Furthermore, the system may guide the headset user to an advantageous setup of the interface unit, thus providing the user with a satisfactory performance of the headset.

In one embodiment of the system, the interface unit is according to an above-mentioned embodiment. Furthermore, the system comprises a dial-in setup server, wherein the telephone and the dial-in setup server may be communicatively connected via a telephone line. By further adapting the system to enable connection to a dial-in setup server, an automatic calibration of a microphone gain is achieved. This helps the user achieve an optimum or near optimum calibration in a user friendly manner.

The invention is explained in detail below with reference to the drawing, in which FIG. 1 is an overview of a) a telephone with a handset, b) a telephone with a headset connected via an interface unit, and c) a telephone with a headset wirelessly connected via an interface unit.

FIG. 6 is a flowchart of part of an embodiment of the method shown in FIG. 4, where a) and b) show alternatives to the final method steps.

Figure 1A:
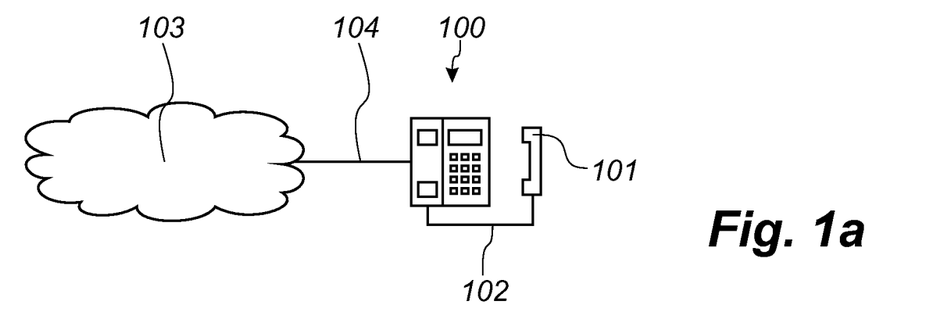
Figure 1B:
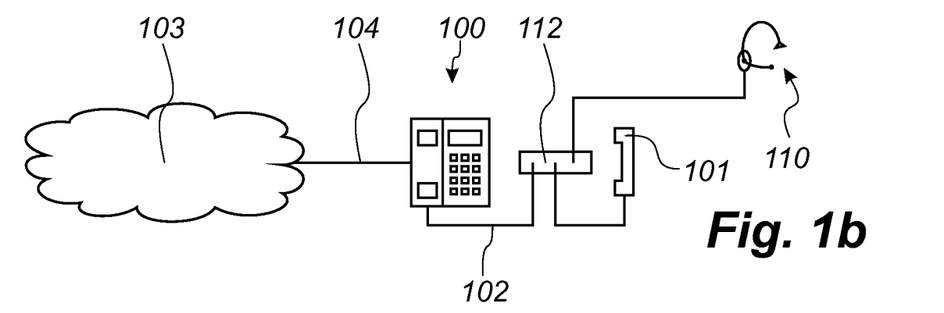
Figure 1C:
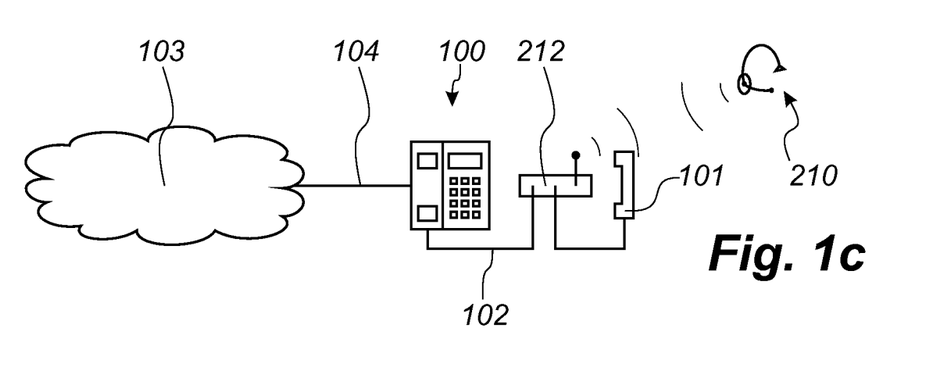

A telephone 100 is illustrated in FIG. 1a. Forming part of the telephone 100 is a handset 101, which is connected by a handset line 102. The telephone 100 is connected to a telecommunication network 103 by a telephone line 104. Most commonly, the telephone 100 is sold including the handset 101 as part of a kit. Whereas the telephone line 104 is regulated with regards to the physical properties of the plug socket, the pin-out of the plug, and the electrical signals, the handset line 102 is unregulated. Therefore, many variations of the handset line 102 are found in the vast number of telephone models and manufactures found in use. This is not an issue, as long as the telephone 100 is merely used with the corresponding handset 101. However, a number of issues arise if a headset 110, 210 is to be connected to the telephone 100 via an interface unit 112, 212 as illustrated in FIGS. 1b and 1c. The handset 101 of the telephone 100 illustrated in FIGS. 1b and 1c is connected to the interface unit 112. However, some telephone models also comprise a dedicated headset port (not shown), besides the conventional handset port. On such a telephone, the handset may remain connected directly to the handset port of the telephone, and the interface unit 112 may be connected to the headset port. In this case, a handset port on the interface unit may be unused, and the interface unit must be configured for the headset port of the telephone.

The headset 110 may be connected by a wire to the interface unit 112, as shown in FIG. 1b. Alternatively, the headset 210 may be connected wirelessly to the interface unit 212 as shown in FIG. 1c. The permutation setting of the interface unit 112, 212 must particularly be configured to match that of the handset line 102. Generally, four signal lines of the handset line 102 consist of a pair of transmit lines and a pair of receive lines, respectively denominated as TX+, TX−, RX+, and RX−. Thus, 24 separate settings exist. However, the polarity is in general not significant, meaning, e.g. that TX+ on the telephone 100 may be connected to TX− on the interface unit 112, 212 without detrimental effects. This reduces number of distinct permutation settings to 6. The 6 distinct permutation settings are labelled "A"-"F", according to this table, where 1-4 are the corresponding wire connections:

|   | 1 | 2 | 3 | 4 |
|---|---|---|---|---|
| A | TX+ | RX+ | RX− | TX− |
| B | RX+ | TX+ | TX− | RX− |
| C | TX+ | TX− | RX+ | RX− |
| D | RX+ | RX− | TX+ | TX− |
| E | TX+ | RX+ | TX− | RX− |
| F | RX+ | TX+ | RX− | TX− |
| G | TX+ | RX+ | RX− | TX− |

Setting "G" is special, since the permutation setting is identical to setting "A", but with a different electrical setup corresponding to a microphone of the carbon-type. Permutation settings "A" and "B" are complementary, since all wires are switched from TX to RX, or from RX to TX. Thus, if the telephone 100 expects permutation setting "A", and the interface unit 112, 212 is set to permutation setting "B", all wires are connected wrong. Likewise, permutation settings "C" and "D" are complementary, and "E" and "F" are complementary.

Figure 2:
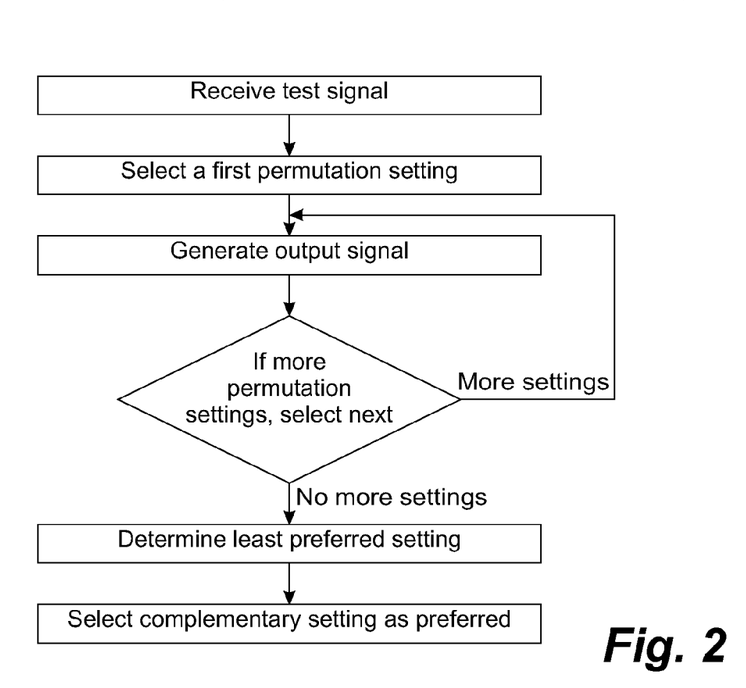
FIG. 2 is a flowchart of a method for automatic configuration of an interface unit.

FIG. 2 depicts how the knowledge of the complementary permutation settings may be used in an automated method for configuring the permutation setting in an interface unit.

Firstly, the interface unit is arranged to receive a test signal. Advantageously, the dial tone from the telephone line is used as the test signal, but it is evident to a person skilled in the art that other test signals may be used. This signal is received on the RX+ and RX− wires from the telephone. A first permutation setting is selected at the interface unit, and an output signal, such as a measurement of a parameter of the test signal, is generated in response to the received test signal. This is repeated with the remaining permutation settings. The series of output signals recorded are then analysed to determine a worst or a least preferred setting. A simple analysis may be to merely select the setting with the lowest signal strength as the least preferred. This least preferred setting is highly likely to have all wires connected incorrectly, meaning that its complementary setting has all wires connected right. Therefore, the complementary setting is selected in the final method step as the preferred setting.

Alternatively, a ratio between the output signals may be calculated for each complementary pair, and selecting the pair with the highest ratio as the pair with the preferred and least preferred setting. From this pair it is simple to select the preferred setting. Different choices of output signal may be conceived, where advantageous choices are a signal strength measurement, measurement of total harmonic distortion, and/or a signal to noise ratio. However, it is evident to the skilled person that other output signals may be used in combination with, or instead of the above listed choices. Likewise, it is clear to the skilled person that two or more output signals, corresponding to the same permutation setting may be used in combination, e.g. to increase confidence in selecting the correct permutation setting. For example, a combination of signal strength and a signal to noise ratio may be used.

Figure 3:
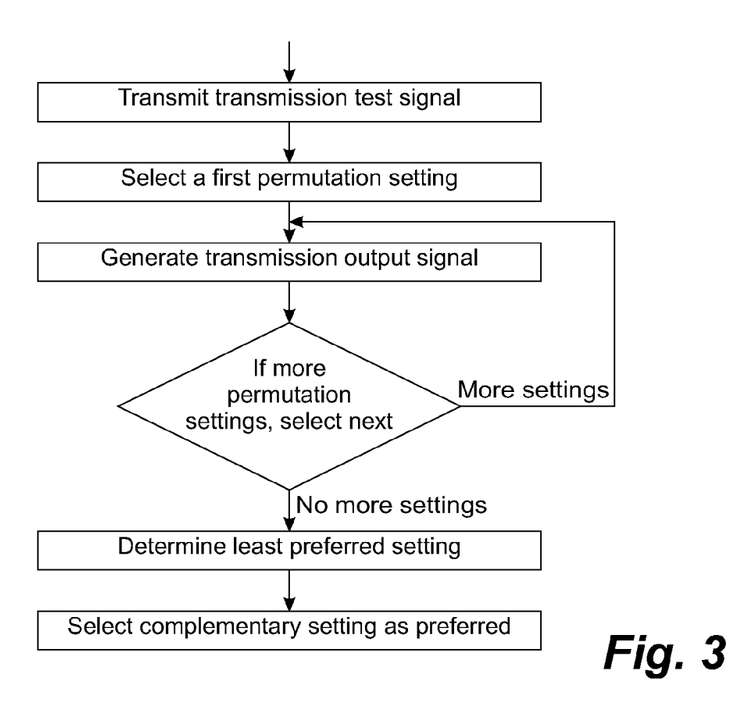
FIG. 3 is a flowchart of part of an embodiment of the method shown in FIG. 2.

Commonly, the correct permutation setting may be found by just analysing the receive lines. However, in special cases it may be necessary to also test the transmit lines. This is shown in FIG. 3, illustrating the additional steps that may be taken, in addition to the steps shown in FIG. 2. In this case, a transmission test signal is transmitted from the interface unit 112, 212 towards the telephone 100. The transmission test signal is received by an analysing unit e.g. being connected between the telephone 100 and the telecommunication network 103, or being connected to the telephone 100 via the telecommunication network 103 at a remote location. Based on the transmission test signals, transmission output signals are generated for each permutation setting by the analysing unit. The choice of which transmission output signal or signals to generate is the same as the choice of output signal described above. However, it is clear to the skilled person that the specific choice of output signal does not necessarily require the same choice of transmission output signal.

In one embodiment, the transmission output signals for each permutation setting are transmitted from the analysing unit to the interface unit, e.g. by use of a data transfer protocol.

In another embodiment, the transmission output signals are analysed at the analysing unit, whereafter only the result of the analysis is transmitted to the interface unit. In the latter case, the result may either be the least preferred setting or the preferred setting.

Besides finding the correct permutation setting, the microphone gain must be calibrated to complete the setup procedure of the interface unit.

Figure 4:
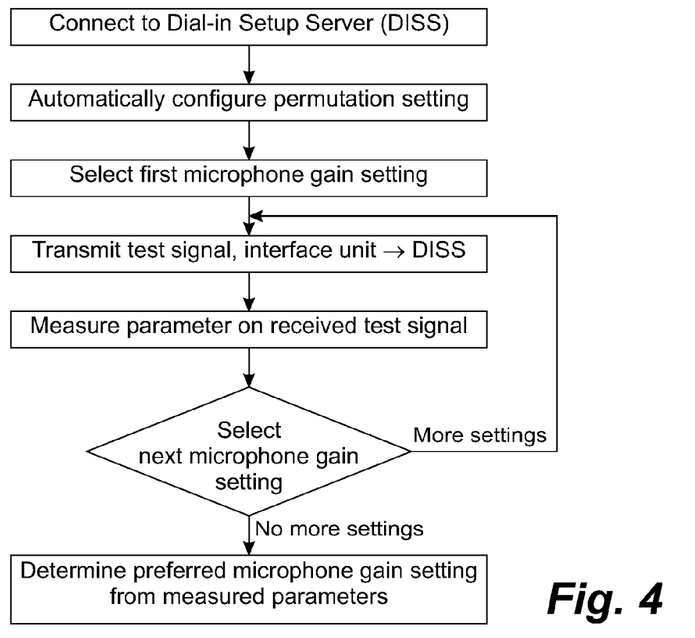
FIG. 4 is a flowchart of a method for calibrating a microphone gain.

FIG. 4 shows a method for automatically calibrating the microphone according to the present invention. A connection to a dial-in setup server (DISS) is established, and the permutation setting is found by use of the method described above. However, according to a broader aspect of the invention, the permutation setting may be selected in any suitable way. A first microphone gain setting is selected and a test signal is transmitted from the interface unit to the DISS, where a signal measurement is performed. This is repeated for subsequent gain settings, after which the DISS transmits a signal to the interface unit that indicates which microphone gain setting to apply.

Alternatively, the DISS may signal that the measurements have failed and must be repeated. If the microphone gain calibration fails, it may be an indication that the permutation setting used is not correct, thus the calibration method may also act as a verification of the permutation setting. In this case, the interface unit should be instructed to change to another permutation setting. In this capacity, the DISS may act as the analysing unit described above for the permutation configuration method as shown in FIG. 4.

Advantageously, the test signals transmitted from the interface unit may be dual-tone multi-frequency (DTMF) signals, where each gain setting is designated an individual DTMF tone. In this way, the DISS may readily determine which gain setting was used when transmitting a received signal. Likewise, the DISS may use a DTMF tone to signal the interface unit on which gain setting to apply. Preferably, the DISS should not use the same DTMF tone as transmitted from the interface, in order to avoid an echo from being misinterpreted as a DISS acknowledgement for a correct found setting. Thus, if the gain setting corresponding to DTMF tone "5" is to be applied, the DISS should signal this back to the interface unit with, e.g. DTMF tone "3". A special DTMF tone may be assigned to indicate that no suitable gain setting has been found. Depending on which measurement is performed at the DISS, the criterion for selecting the microphone gain setting may differ. In a simple case, the gain setting, which results in a test signal with a signal strength closest to a given target signal level is chosen. This criterion may be combined with a qualitative measurement, such as a signal to noise ratio or a measurement of a total harmonic distortion. It is clear to the skilled person that other suitable measurements may be used instead of, or in addition to the ones mentioned here.

Figure 5:
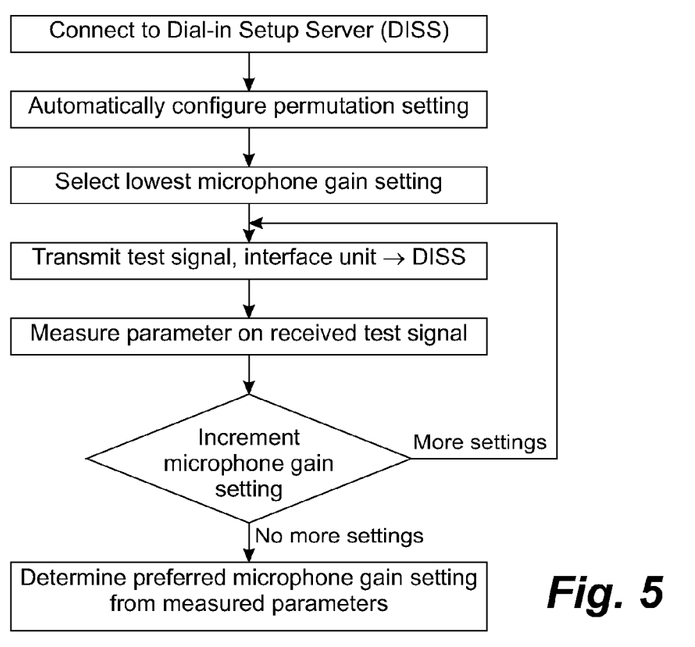
FIG. 5 is a flowchart of an embodiment of the method shown in FIG. 4.

FIG. 5 shows an advantageous embodiment of the microphone calibration method as shown in FIG. 4. Therefore, only the differences between the two embodiments are described here. According to this embodiment, the lowest microphone gain setting is chosen as the first gain setting for transmitting the first test signal. Then the microphone gain setting is incremented for each setting, until either all gain settings have been tested, or until the measurement series is terminated by another criterion. In this way, the influence of signal clipping in the telephone is prevented from affecting the trans-mission of the microphone gain setting that is later chosen. This could otherwise occur, if a small gain signal was transmitted shortly after a high gain signal.

Figure 6A:
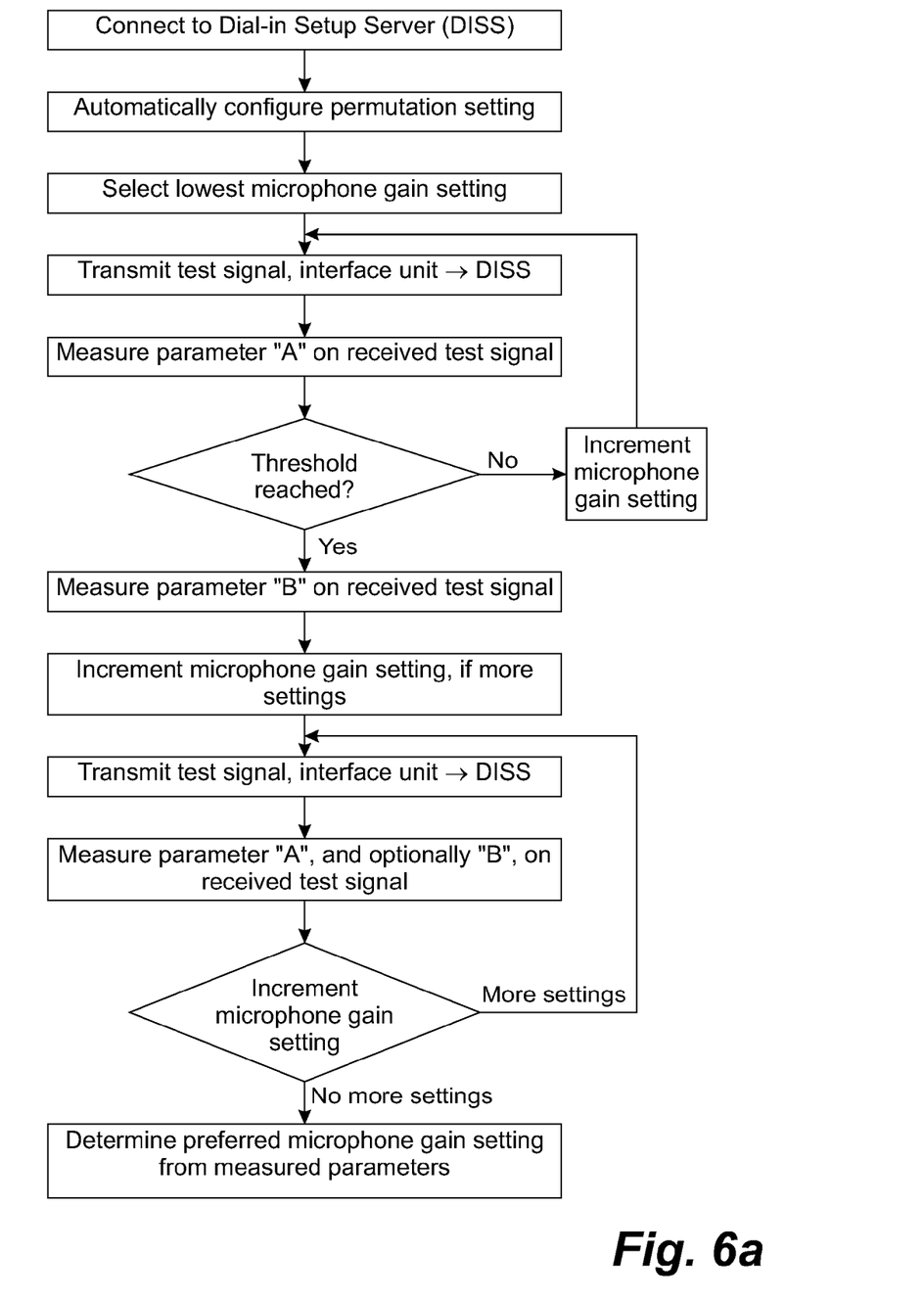

FIG. 6a shows an embodiment of the method shown in FIG. 5, where only the differences between the two variations are described here. In the present embodiment, a first parameter "A" is measured for the test signals corresponding to a number of microphone gain settings for each increasing step until the measured value reaches a given threshold. Hereafter, a second parameter "B" is measured instead of, or in addition to "A" for one or more gain settings. For instance, the signal strength is measured for each step until a predetermined lower threshold is reached. Then for one or more remaining gain settings, both the signal strength and, e.g. a signal to noise ratio and/or a total harmonic distortion is additionally measured.

Figure 6B:
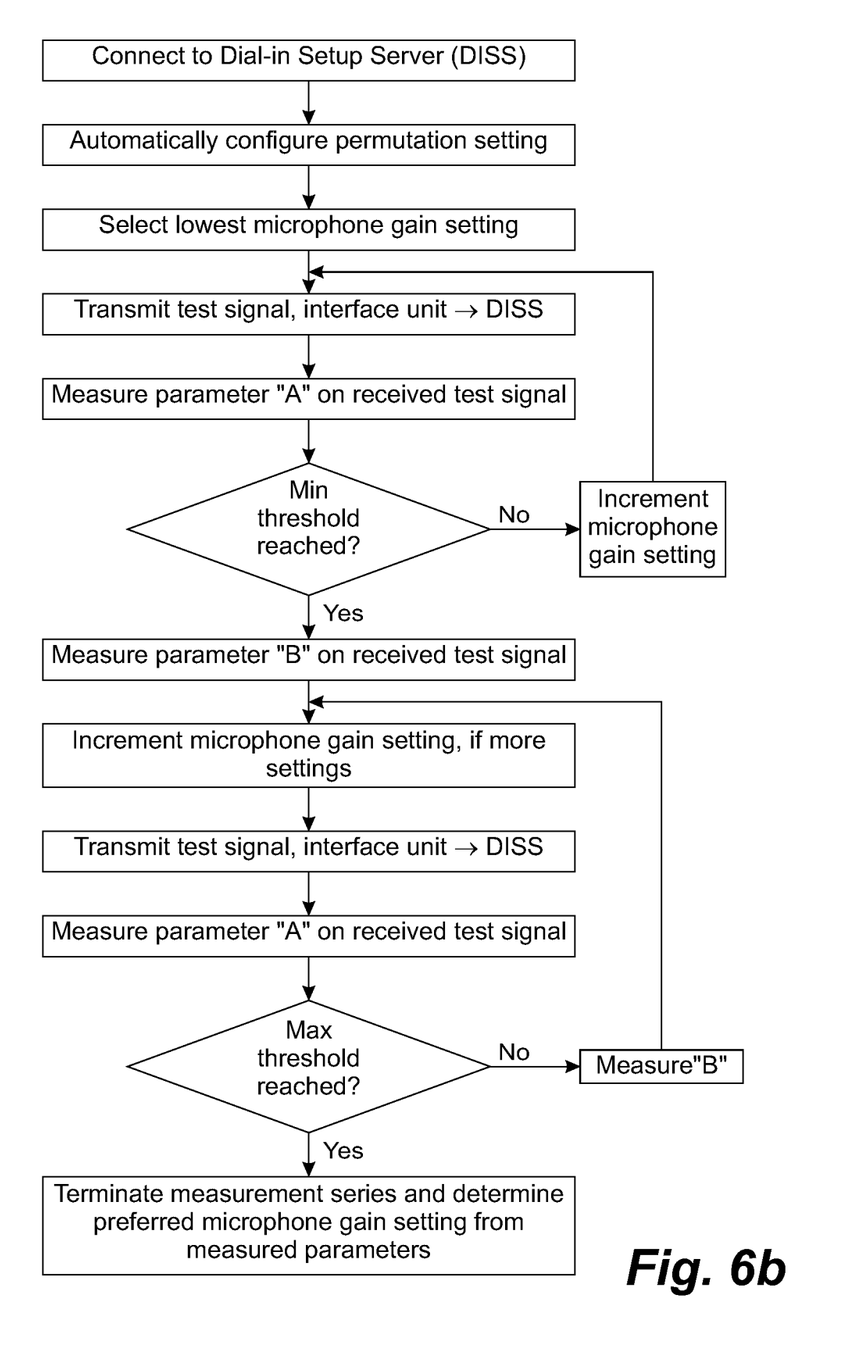

FIG. 6b shows further steps, which may optionally be appended to the method, where a second threshold for the parameter "A" is also defined. In this case, measurements of "A" and "B" are made for all steps, where "A" is above the first lower threshold, until the measurement value of "A" reaches or exceeds the second higher threshold. At this point, the measurement series may be terminated, thus ignoring any remaining gain settings, or the remaining gain settings may be tested measuring only parameter "A". It is evident to the skilled person that multiple parameters, not limited to two, may be measured for each microphone gain setting.

Furthermore, it is evident to the skilled person that a third or subsequent parameter may be measured depending on other threshold values than those for the second parameter. For instance, parameter "B" is measured, depending on parameter "A" being in a given range, while parameter "C" is measured, depending on parameter "B" being in another given range.

FIG. 7 shows additional steps, which may be performed by the DISS after a microphone gain setting has been found.

Figure 7A:
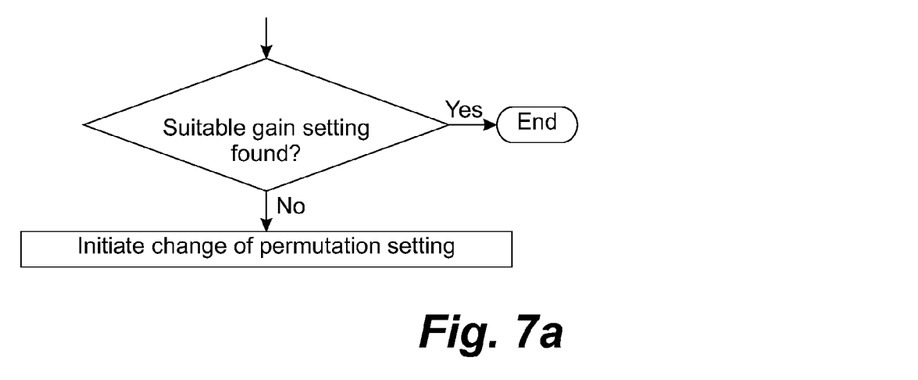
FIG. 7 is a flowchart of part of an embodiment of the method shown in FIG. 4.

FIG. 7a shows a general test, where the measurement or measurements of the test signal corresponding to the found microphone gain setting is subject to test whether it is within the target signal range. Also, the microphone gain setting may be checked as to whether it is unusually high or low. A failure in either of these tests may indicate that the permutation setting used was not correct. Therefore, a procedure to change the permutation setting is initiated. After the permutation setting has been changed, the microphone calibration procedure may be attempted again to test if the new permutation settings yields better results.

Figure 7B:
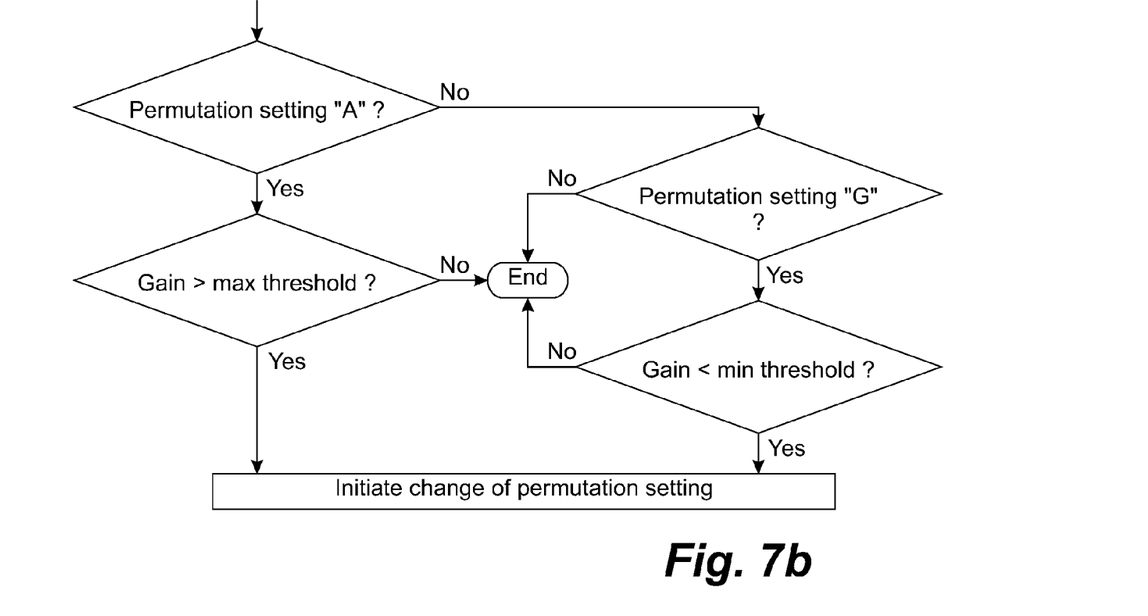

A special case, shown in FIG. 7b, is if permutation setting "A", corresponding to a conventional electret microphone, and an unusually high microphone gain is found to be needed. This indicates that the telephone 100 expects a microphone of the carbon-type. Therefore, the permutation setting must be changed to "G". Likewise, if setting "G" was tested, and an unusually low gain setting was found, the permutation setting should be changed to "A".

Figure 8:
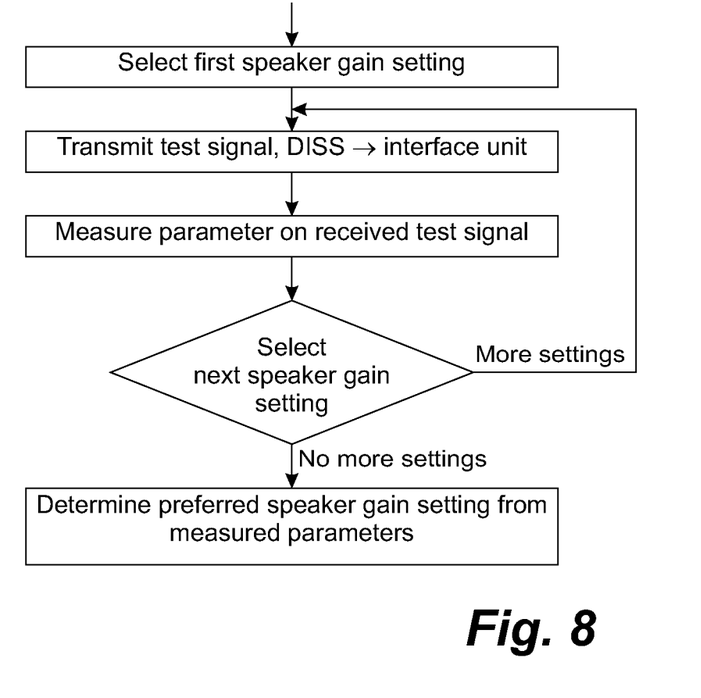
FIG. 8 is a flowchart of part of an embodiment of the method shown in FIG. 4.

FIG. 8 shows a speaker calibration method, which may be completed during the microphone calibration method, as shown in FIG. 4. While the connection to the DISS remains active, but e.g. after a suitable microphone gain has been found, a first speaker gain setting is selected. The DISS transmits a first test signal to the interface unit, where a parameter of the received test signal is measured. This is repeated for a number of speaker gain settings, after which a preferred speaker gain setting is determined, either at the interface unit, or by the DISS, after the measurement values have been transmitted from the interface unit to the DISS. Naturally, more than one parameter may be measured for each speaker gain setting, and the number of parameters measured does not need to be constant for all gain settings. During the speaker calibration procedure, potentially loud sound signals may be transmitted from the DISS to the interface unit, being unpleasant or even damaging to the hearing of the headset user. But since the interface unit may be provided from the manufacturer with a prior knowledge of the sound volume emitted from the headset speaker for a given signal provided to the headset, the actual speaker may be muted during the procedure. Fine adjustment of the speaker volume may be left to the user to account for personal preference.

Figure 9:
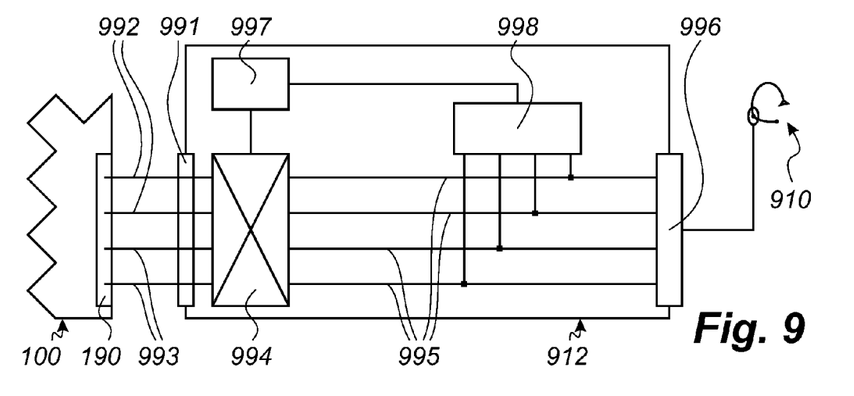
FIG. 9 is a schematic of an interface unit according to the invention.

FIG. 9 illustrates a telephone 100, which is connected to a headset 910 via an interface unit 912. The telephone port 991 on the interface unit 912 is connected to a handset port 190 on the telephone 100 by four electrical connections 992, 993, where two electrical connections 992 form a receive pair and the other two electrical connections 993 form a transmit pair. The order of the electrical connections as shown in FIG. 9 are illustrative only, as in general all connections may form part of either the receive or the transmit pair. The interface unit 912 comprises a switching means 994, which may switch each of the electrical connections 992, 993 from the telephone to the receive and transmit lines 995 of the headset connection means 996. The switching means 994 must at least be able to switch the electrical connections 992, 993 to the six distinct permutation setting described above for the permutation configuration method. However, since polarity does generally not matter, it is generally not necessary for the switching means 994 to be able to address all twenty-four possible combinations. The switching means 994 is controlled by a controlling means 997, which also controls and receives measurements from a measurement means 998. The measurement means 998 is connected to the receive and transmit lines 995 inside the interface unit 912 on the headset side of the switching means 994. In this way, the measurement means 998 may perform measurements on the signals transmitted over these lines, e.g. during permutation setting configuration. The interface unit 912 as described here is therefore adapted to perform the afore-mentioned inventive permutation setting configuration method as shown in FIG. 2.

Many different measurements are conceivable for the measurement means 998 to perform, common choices including a signal strength, a signal to noise ratio, and/or a total harmonic distortion. It is clear to the skilled person, that the measurement means 998 is not limited to measure one signal parameter, but may be arranged to allow measurements of two, three, or more different parameters, consecutively or in parallel. Connection between the headset 910 and the headset connection means 996 may be provided either by an electrical connection or by a wireless connection.

Figure 10:
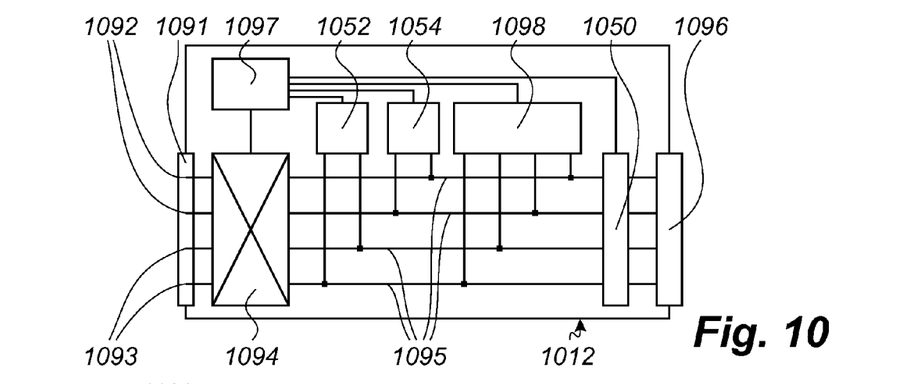
FIG. 10 is a schematic of another interface unit according to the invention.

FIG. 10 illustrates an embodiment of an interface unit 1012 corresponding to the interface unit shown in FIG. 9, where like reference numerals refers to like parts. Therefore, only differences between the two embodiments are described here. The interface unit 1012 comprises a variable gain circuit 1050, which is controlled by the controlling means 1097. Furthermore, the interface unit 1012 comprises a signal generating means 1052 and a signal receiving means 1054. This embodiment of the interface unit 1012 is thus adapted to perform the aforementioned inventive microphone calibration method as shown in FIG. 4. Advantageously, the signal generating means 1052 are adapted to generate DTMF tones to be transmitted via the telephone 100 and telephone line 104. Likewise, the signal receiving means 1054 are advantageously adapted to decode DTMF tones that are received from the telephone line 104 via the telephone 100.

Figure 11:
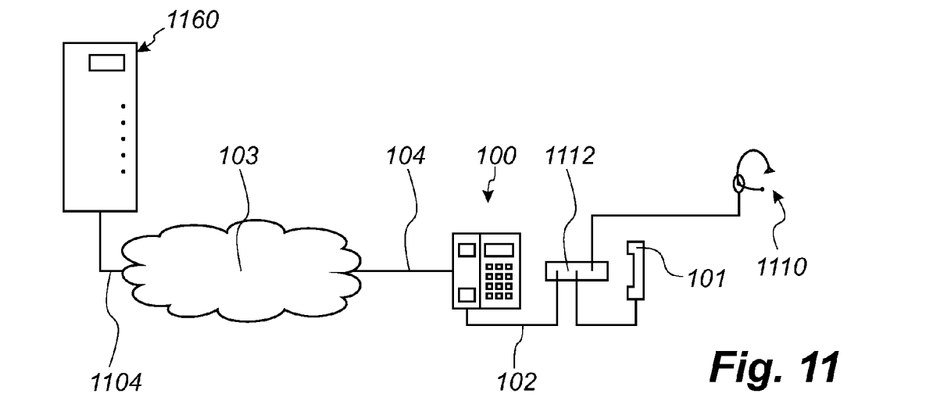
FIG. 11 is a schematic of a system according to the invention.

FIG. 11 shows a system for voice communication comprising a telephone 100, which is connected to a headset 1110 via a handset line 102 and an interface unit 1112, as described above in FIG. 10. Also connected to the interface unit 1112 is the handset 101 of the telephone 100. The telephone is connected via a telephone line 104 to a telecommunications network 103, and may be communicatively connected to a dial-in setup server (DISS) 1160 via the network 103 and a second telephone line 1104. The DISS 1160 is adapted to receive and perform measurements of one or more parameters on signals incoming from the second telephone line 1104. Furthermore, the DISS 1160 is adapted to generate and transmit signals over the second telephone line 1104. Thus, the interface unit 1112 and the DISS are adapted to perform automatic microphone calibration according to the aforementioned method. Advantageously, the signals exchanged between the interface unit 1112 and the DISS 1160 are DTMF tones. Additionally, the DISS 1160 may be adapted to log various statistical information about the incoming call from the telephone 100, and data on the interface unit configuration and microphone calibration.

The invention has been described with reference to preferred embodiments. Many modifications are conceivable without thereby deviating from the scope of the invention. Modifications and variations obvious to those skilled in the art are considered to fall within the scope of the present invention. For example, the interface unit is here described as a separate unit. However, the interface unit may be built into a headset, a headset amplifier, a headset base unit, or may be integrated with other peripheral units, which are adapted for being connected to a telephone.

| Reference numeral list: | |
|---|---|
| 100 | telephone |
| 101 | handset |
| 102 | handset line |
| 103 | telecommunication network |
| 104, 1104 | telephone line |
| 110, 210, 910, 1110 | headset |
| 112, 212, 912, 1012, 1112 | interface unit |
| 190 | handset port |
| 991, 1091 | telephone port |
| 992, 1092 | electrical connection, receive |
| 993, 1093 | electrical connection, transmit |
| 994, 1094 | switching means |
| 995, 1095 | receive and transmit lines |
| 996, 1096 | headset connection means |
| 997, 1097 | controlling means |
| 998, 1098 | measurement means |
| 1050 | variable gain circuit |
| 1052 | signal generating means |
| 1054 | signal receiving means |
| 1160 | dial-in setup server |

The invention claimed is:

1. A method for automatically configuring an interface unit for connecting a headset and a telephone having electrical connections, comprising:

the electrical connections between the interface unit and the telephone include two pairs of electrical paths having a number of distinct permutation settings, and wherein each of the number of distinct permutation settings have a complementary setting together forming a number of distinct complementary setting pairs, wherein the two connections of a transmit pair of electrical paths are denoted TX+ and TX−, and the two connections of a receive pair of electrical paths are denoted RX+ and RX−, wherein the permutation settings have seven distinct configurations, which settings are denoted:

| | 1 | 2 | 3 | 4 |
|---|---|---|---|---|
| A | TX+ | RX+ | RX− | TX− |
| B | RX+ | TX+ | TX− | RX− |
| C | TX+ | TX− | RX+ | RX− |
| D | RX+ | RX− | TX+ | TX− |
| E | TX+ | RX+ | TX− | RX− |
| F | RX+ | TX+ | RX− | TX− |
| G | TX+ | RX+ | RX− | TX− | and wherein permutation settings A and B are complementary, C and D are complementary, and E and F are complementary, further comprising the steps of:
   a) receiving a test signal,
   b) for each distinct permutation setting generating an output signal in response to the test signal
   c) determining a least preferred distinct permutation setting based on the output signals,
   d) selecting the complementary setting to the least preferred distinct permutation setting as a preferred setting.

2. A method according to claim 1, wherein the test signal received in step a) is a dial-tone.

3. A method according to claim 1, wherein the output signals generated in step b) are based on measurements of one or more of a signal strength, a total harmonic distortion, and/or a signal-to-noise ratio for each distinct permutation setting.

4. A method according to claim 1, wherein step c) and step d) are carried out jointly by, for each distinct permutation setting determining a ratio between the output signal from the permutation setting and the output signal from the complementary setting, and selecting the setting with the highest ratio as the preferred setting.

5. A method according to claim 1, further comprising the steps of:
   a1) transmitting a transmission test signal,
   b1) for each distinct permutation setting generating a transmission output signal in response to the transmission test signal, and
   c1) determining a least preferred permutation setting based on the output signals and the transmission output signals.

6. A calibration method for automatically configuring an interface unit for connecting a headset and a telephone, the interface unit having a variable gain circuit for setting a microphone gain, the method comprising the steps:
   a) establishing a connection to a dial-in setup server, DISS,
   b) automatically configuring the permutation settings of the interface unit, according to claim 1,
   c) for at least a first microphone gain setting, transmitting a test signal from the interface unit to the dial-in setup server, and at the dial-in setup server measuring at least a first parameter of the received test signal, and
   d) determining a preferred microphone gain setting based on measurements performed in step c).

7. A method according to claim 6, wherein the measured parameter in step c) is any one of a quantitative signal parameter, such as a signal strength, or a qualitative signal parameter, such as a signal-to-noise ratio, a total harmonic distortion, or any other suitable signal parameter.

8. A method according to claim 6, wherein step c) comprises the steps of:
   c1) selecting a lowest gain setting and transmitting a test signal, and measuring at least a first parameter of the received test signal at the dial-in setup server, and
   c2) repeating step c1) for an incremented gain setting, up until reaching a maximum gain setting.

9. A method according to claim 8, wherein a measurement is performed for each gain setting, until the measurement reaches a threshold value, after which one or more supplementary measurements are performed for each of one or more remaining gain settings.

10. A method according to claim 6 wherein the test signals transmitted from the interface unit are unique for each tested gain setting.

11. A method according to claim 6, wherein the test signals transmitted from the interface unit are dual-tone multi-frequency, DTMF, signals.

12. A method according to claim 6, wherein the method further comprises the steps of:
   e) if no suitable gain setting is found, initiating a procedure to change permutation setting to an alternative setting.

13. A method according to any of the claim 12, wherein the variable gain circuit also comprises a gain setter for setting a speaker gain, further comprising the steps of:
   g) for at least a first speaker gain setting, transmitting a test signal from the dial-in setup server to the interface unit, and at the interface unit measuring at least a first parameter of the received test signal, and
   h) determining a preferred speaker gain setting based on measurements performed in the previous step.

14. A method according to claim 13, further comprising the step of:
   i) Logging statistical information about configuration at the dial-in setup server, the statistical information being one or more of the following:
      basic call information, such as caller ID and call length,
      preferred permutation setting and number of permutation settings tested,
      preferred calibration setting found by calibration method,
      measured parameters of the received test signals,
      status for calibration process upon call completion,
      number of retransmission,
      round trip delay in telecommunication network, and/or
      time for user to manually switch permutation setting.

15. An interface unit for connecting a headset to a telephone in a system, comprising: a telephone having a handset port, the handset port having one pair of receive connections for transmitting signals received from a telephone line to a handset, and one pair of transmit connections for receiving signals to be transmitted to the telephone line from the handset, and the headset comprises an interface connection for connecting the headset to the interface unit, wherein the interface unit, comprises a telephone side and a headset side, the telephone side comprising a telephone port, and the headset side comprises a headset connection for being connected to the interface connection on the headset, wherein the telephone port comprises at least four electrical connections, wherein two electrical connections form a receive pair and the two other electrical connections form a transmit pair, respectively denominated as TX+, TX−, RX+, and RX−, wherein the interface unit further comprises:
   switch adapted for configurably connecting the four electrical connections on the telephone side of the interface unit to the headset connector,
   measurement element on the headset side of the switch for measuring a signal received through the telephone port, and
   controller for configuring the switch and for analyzing measurements obtained from the measurement element, the controller being adapted for determining a least preferred setting of the switch, and the controller being adapted for configuring the switch to the setting found to be the preferred setting, wherein the controlling element, are further adapted for determining a preferred setting as the complement of the least preferred setting, wherein the complement is defined by all wires being switched from TX to RX, or from RX to TX.

16. An interface unit according to claim 15, further comprising a variable gain circuit for adjusting a microphone gain, the variable gain circuit being controllable by the controlling element, wherein the interface unit further comprises:

a signal generator adapted for generating one or more test signals to be transmitted over the telephone line, wherein the signal generator is connected to the variable gain circuit, and a signal receiver for receiving a signal from the telephone line, wherein the signal generator and the signal receivers are both being controlled by the controller.

17. A system for voice communication comprising:

a headset for communication, the headset comprising an interface connection, a telephone, and an interface unit according to claim 16 for connecting the headset to the telephone.

18. A system according to claim 17, wherein:

the interface unit is according to claim 17, and the system further comprising a dial-in setup server, wherein the telephone and the dial-in setup server may be communicatively connected via a telephone line.

\* \* \* \* \*